United States Patent
Jungfer et al.

(10) Patent No.: US 11,656,957 B1
(45) Date of Patent: May 23, 2023

(54) MANAGING NODES OF A DBMS

(71) Applicant: International Business Machines Corporation, Armonk, NY (US)

(72) Inventors: Martin Jungfer, Ostelsheim (DE); Jens Peter Seifert, Gaertringen (DE); Karl Fleckenstein, Malsch (DE); Thomas Rech, Rittersheim (DE); Alexander Zietlow, Sandhausen (DE); Dirk Nakott, Stuttgart (DE); Holger Hellmuth, Bensheim (DE); Hans-Jürgen Zeltwanger, Weinsberg (DE)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 17/539,640

(22) Filed: Dec. 1, 2021

(51) Int. Cl.
*G06F 11/07* (2006.01)
*G06F 11/18* (2006.01)
*G06F 16/2453* (2019.01)
*G06F 11/30* (2006.01)

(52) U.S. Cl.
CPC ........ *G06F 11/181* (2013.01); *G06F 11/3006* (2013.01); *G06F 16/24534* (2019.01)

(58) Field of Classification Search
CPC .......................... G06F 11/181; G06F 11/3006
USPC .............................................. 714/3, 4.11, 6.3
See application file for complete search history.

(56) References Cited

U.S. PATENT DOCUMENTS

| | | | |
|---|---|---|---|
| 7,921,090 B2 * | 4/2011 | Ho | G06F 16/2343 707/704 |
| 9,727,374 B2 | 8/2017 | Ghosh | |
| 10,372,329 B1 * | 8/2019 | Ahrens | G06F 3/0665 |
| 10,489,170 B2 | 11/2019 | Toal | |

(Continued)

FOREIGN PATENT DOCUMENTS

| | | | |
|---|---|---|---|
| CN | 102254031 A | | 11/2011 |
| CN | 106570074 A | | 4/2017 |
| CN | 115129779 A | * | 9/2022 |

OTHER PUBLICATIONS

"QUIESCE command", IBM Documentation, Db2 11.5, downloaded from the Internet on Nov. 3, 2021, 5 pages, <https://www.ibm.com/docs/en/db2/11.5?topic=commands-quiesce>.

(Continued)

*Primary Examiner* — Chae M Ko
(74) *Attorney, Agent, or Firm* — Randy Tejeda

(57) ABSTRACT

A tool for replacing a first database node of a database management system by a second database node. The tool receives an indication that the first database node received a data access request for accessing a database shared between the first database node and the second database node. The tool duplicates the data access request at the first database node. Responsive to a determination that the duplicated data access request includes a data changing statement and a previously executed statement, the tool modifies the duplicated data access request to prevent execution of the data changing statement and the previously executed statement at the second database node. The tool executes the modified duplicated data access request at the second database node. The tool replaces, based on a replacement condition being met, the first database node with the second database node in the database management system.

20 Claims, 8 Drawing Sheets

(56) References Cited

U.S. PATENT DOCUMENTS

| | | |
|---|---|---|
| 10,613,893 B2 | 4/2020 | Yadav |
| 10,965,752 B1 | 3/2021 | Smith |
| 2016/0170978 A1 | 6/2016 | Michael |
| 2016/0203050 A1 | 7/2016 | Hrle |
| 2016/0314016 A1 | 10/2016 | Ghosh |
| 2017/0308568 A1* | 10/2017 | Laethem .................. G06F 8/65 |
| 2017/0353515 A1 | 12/2017 | Papapanagiotou |
| 2018/0181469 A1* | 6/2018 | Yueh .................... G06F 16/188 |
| 2018/0322157 A1 | 11/2018 | Lee |
| 2020/0097593 A1 | 3/2020 | Chen |
| 2021/0034775 A1 | 2/2021 | Bender |
| 2022/0138060 A1* | 5/2022 | Sangala ................. G06F 9/547 |
| | | 714/6.3 |

OTHER PUBLICATIONS

"Setting up partitioned database environments", IBM Documentation, Db2 11.5, downloaded from the Internet on Nov. 3, 2021,4 pages, <https://www.ibm.com/docs/en/db2/11.5?topic=partitions-setting-up-partitioned-database-environments>.

Mell et al., "The NIST Definition of Cloud Computing", Recommendations of the National Institute of Standards and Technology, Special Publication 800-145, Sep. 2011, 7 pages.

International Search Report for International Application No. PCT/IB2022/061496 dated Mar. 13, 2023, 7 pages.

\* cited by examiner

MANAGING NODES OF A DBMS

BACKGROUND OF THE INVENTION

The present invention relates generally to digital computer systems, and more particularly to a database management system.

A database management system (DBMS) is a software package designed to define, manipulate, retrieve and manage data in a database. A DBMS generally manipulates the data itself, the data format, field names, record structure and file structure. It also defines rules to validate and manipulate this data.

Database management systems are set up on specific data handling concepts, as the practice of administrating a database evolves. The earliest databases only handled individual single pieces of specially formatted data. Presently, more evolved systems can handle different kinds of less formatted data and tie them together in more elaborate ways.

SUMMARY

Various embodiments provide a method, computer system and computer program product as described by the subject matter of the independent claims. Advantageous embodiments are described in the dependent claims. Embodiments of the present invention can be freely combined with each other if they are not mutually exclusive.

In one aspect, the invention relates to a method for replacing a first database node of a database management system by a second database node. The method includes receiving, by one or more computer processors, an indication that the first database node received a data access request for accessing a database shared between the first database node and the second database node. The method includes duplicating, by one or more computer processors, the data access request at the first database node. Responsive to a determination that the duplicated data access request includes a data changing statement and a previously executed statement, the method includes modifying, by one or more computer processors, the duplicated data access request to prevent execution of the data changing statement and the previously executed statement at the second database node. The method includes executing, by one or more computer processors, the modified duplicated data access request at the second database node. The method includes replacing, by one or more computer processors, based on a replacement condition being met, the first database node with the second database node in the database management system.

BRIEF DESCRIPTION OF THE DRAWINGS

In the following embodiments of the invention are explained in greater detail, by way of example only, referring to the drawings in which.

DETAILED DESCRIPTION

Figure 1:
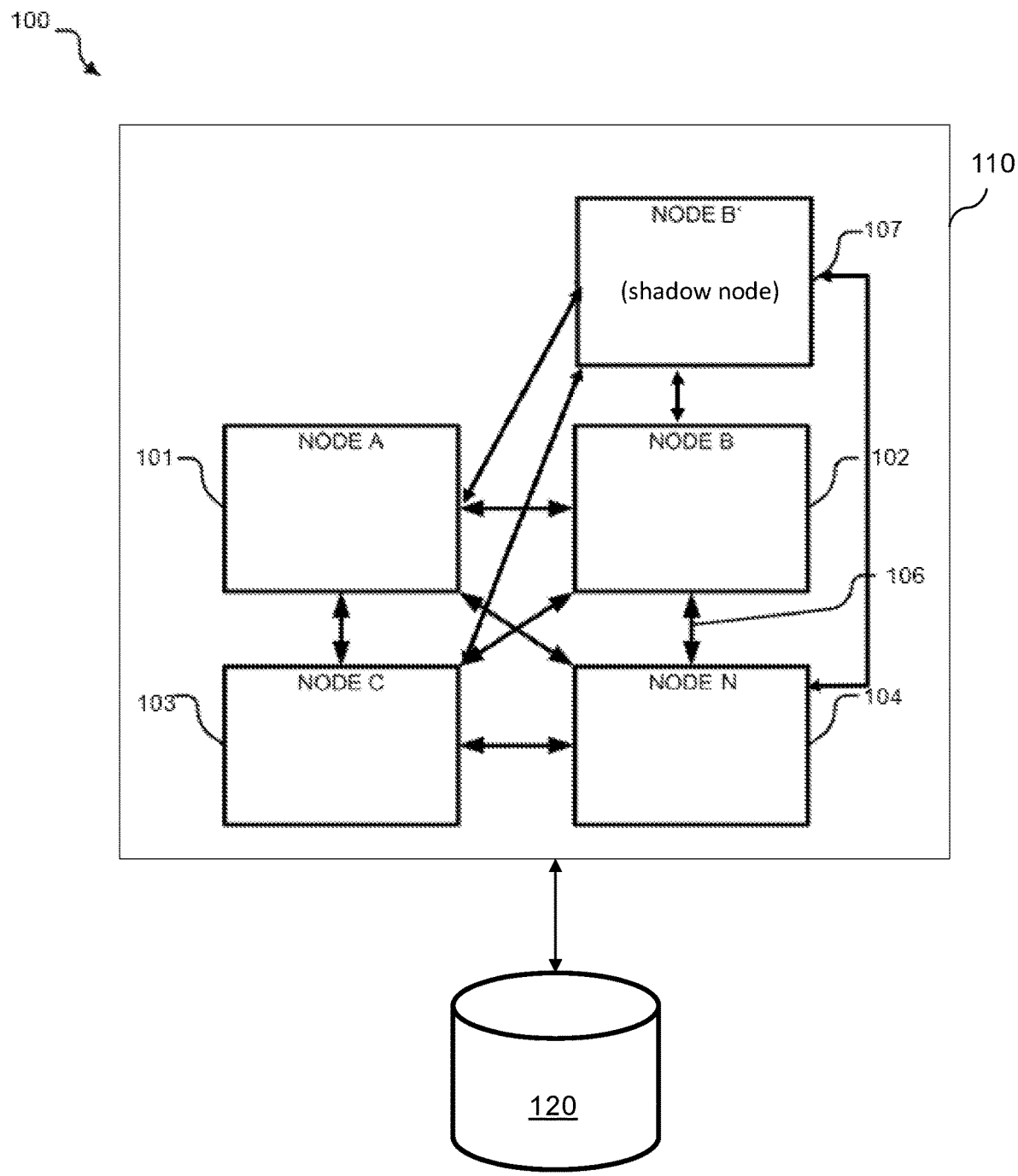
FIG. 1 is a block diagram of a computer system in accordance with an example of the present subject matter.

The descriptions of the various embodiments of the present invention will be presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Database clustering may use a cluster to process and access a database. The cluster may be a group of interconnected computers that work together to perform computational tasks. Each computer is referred to as a database node (also referred to as node). A database management system (DBMS) may manage access to the database using the database nodes. The DBMS is operated in data sharing mode. The database nodes may be synchronized so that each database node is going to have the exact same data as all the other database nodes of the cluster. For example, all nodes in the cluster may have access to the same copy of the database. The database nodes may have access to a shared database. The DBMS may control the distribution of the workloads over the database nodes. The database nodes may execute workloads. A workload may comprise a set of statements. A statement may be a read, update, insert, or delete instruction. For example, the workload may be split into workload units each having a subset of statements, so that each workload unit may be executed in a respective node of the cluster. The data access request as used herein may be one or more statements. In one example, the data access request may be the workload or the workload unit.

The clustering may enable load balancing and high-availability. If one database node collapses, the request destined to the database node may be handled by another database node. This may prevent system failures; however, the processing latency may increase due to a reduced number of database nodes in the cluster. To solve this issue, the failed database node may be replaced by a new database node. However, the node replacement may be a challenging task. The latency may be the time it takes for a user to send a request and get a response.

The cluster may initially comprise an initial set of nodes. The initial set of nodes may comprise the first database node. The second database node may be added to the cluster. The configuration of the second node may be the same as the configuration of the other nodes of the cluster, with the exception that the second node may first be in a preparation state while the other nodes are in a ready state operating (real) data access requests. The configuration may enable the second database node to receive and execute requests on the same copy of the database as the other database nodes of the cluster. The configuration may, for example, be defined by connections of the second database node and data available to the second database node. The second database node may, for example, be connected to every other database node of the cluster. In the preparation state, the second node may be trained according to the present subject matter, before it can be used in a ready state instead of the first database node. For that, during the preparation phase, the second database node may have access to the same database but only for read accesses to avoid modification of the content of the database.

The present subject matter may enable an optimal replacement of the first database node in the cluster because the second database node may be trained to correspond at least partially with the first database node e.g., the cache of the second database node may have at least part of the cache of the first database node.

The present method may have another advantage as follows. After a new database node was introduced and the start-up phase of this database node is complete, it can accept application workloads. However, for a long time after the start-up phase, the DBMS may show low performances because a memory of local cache structures of the new database node is not yet filled and requested data may need to be read from a disk. During the time period, DT, from the database node being ready to accept application workloads up to the point where the local cache structures are filled and thus able to effectively improve performances, end users which are allocated to the new database node may experience significantly increased response times. This can lead to data records being locked longer and therefore affect end users on other database nodes of the same DBMS. From an end user viewpoint, the application workload can then not be processed within the agreed time. This situation may be improved with the replacement method described in this disclosure, especially with the preparation phase that is performed before replacing the first database node. The above time period DT may be reduced to a minimum, e.g., zero, since the second database node of the present subject matter may have the local cache structures filled during the preparation phase with at least part of the local cache structures of the first database node.

According to one embodiment, the method further comprises: evaluating one or more performance indicators for the first database node and the second database node, comparing the evaluated performance indicators, wherein the method is repeated if the comparison result does not satisfy the replacement condition. The method steps may be repeated until the replacement condition is fulfilled. In one example, the replacement condition may comprise a condition (named warm-up condition) requiring that a difference between corresponding evaluated performance indicators is smaller than a respective threshold. For example, the first database node may be replaced by the second database node after determining that the performance indicators are comparable in the first and second database nodes. In another example, the replacement condition may require that a given number of repetitions of the method are performed. That is, the method may be repeated a number n (e.g., n≥0) of times equal to the given number. If the replacement condition is fulfilled after the first/initial execution of the method steps a) to c), then the method steps a) to c) may not be repeated (i.e., the method is repeated zero times) and the first database node may be replaced by the second database node.

According to one embodiment, the first database node is configured to perform the modification of the duplicated data access request, wherein the method further comprises routing the duplicated data access request or, if modified, the modified duplicated data access request by the first database node to the second database node. In other words, if the duplicated data access request is modified by the first database node, the first database node may forward the modified duplicated data access request to the second database node. If the data access request is not modified by the first database node, the first database node may forward the duplicated data access request to the second database node. The performance indicators may, for example, be evaluated and compared by the database management system and the replacement of the first node by the second node may be controlled by the database management system.

For example, the first database node may be configured to filter the data access request so that merely the read-only part of the data access request is additionally sent to the second database node. Filtering may be advantageous as it encompasses the two steps of duplicating and modifying in one step.

According to one embodiment, the second database node is configured to perform the modification of the duplicated data access request, wherein the method further comprises routing by the first database node the duplicated data access request to the second database node.

If the data access request comprises at least one of the data changing statement and the previously executed statement, it may be modified by removing the at least one of the data changing statement and the previously executed statement from the data access request. This may prevent that reoccurring select statements are executed repeatedly without effectively further improving the warm-up state of the local cache structures of the second database node. Improving the warm-up state of the local cache structures means filling the local cache structures with new data. The removal of the data changing statement may prevent that the second database node changes the content of the shared database.

According to one embodiment, replacing the first database node by the second database node comprises routing data access requests intended for the first database node to the second database node so that the data access requests are executed at the second database node and not executed at the first database node. This replacement may be performed by, for example, switching by the DBMS the connections. For example, after the replacement is performed, communications destined to the first database node may be received at the second database node. The replacing of the first database node by the second database node may further comprise disconnecting or disabling the first database node e.g., by removing the first database node by the DBMS from the list of nodes that are used to access the database. After replacing the first database node by the second database node, the second database node may operate within the cluster in the same way as the first database node was operating before the first database node was disconnected. For replacing the first database node by the second database node, the DBMS may, for example, replace the name or identifier of the first database node by the name or identifier of the second database node so that the management of the workloads can seamlessly continue with the same number of nodes as the number of nodes before replacing the first database node. This embodiment may minimize the impact to the end user when executing maintenance tasks on a database node within a DBMS. This embodiment may provide a simple method to prepare the new database node so that the new database node can accept workloads of the database node which is to be maintained and the impact to the end user is small as possible.

According to one embodiment, the replacement condition may comprise a condition (named unplanned outage condition) requiring that the first database node has become unavailable. This may be referred to an unplanned outage of the first database node. This embodiment may be advantageous because in case of an unplanned outage of the first database node, the second database node may take over regardless how good the second database node is already prepared for the workload (e.g., regardless of the warm-up condition being fulfilled or not). This may avoid disruption.

In another example, the unplanned outage may be tied to the warm-up condition of the second database node. For that, the replacement condition may comprise both the warm-up condition and the unplanned outage condition. That is, the replacement condition is fulfilled if both the warm-up and unplanned outage conditions are fulfilled. In one use case, if the warm-up condition is fulfilled before the unplanned outage condition is fulfilled, one may wait until the unplanned outage condition is fulfilled. In other words, the system may first wait until the preparation state of the second database node is good, then wait until the first database node has an unplanned outage (e.g., failure), then replace the first database node with the second database node. For example, after the evaluated performance indicators have indicated that the first database node can be replaced, the unplanned outage condition may be checked to determine whether the first database node has become unavailable in order to execute the replacement of the first database node by the second database node. In another use case, if the unplanned outage condition is fulfilled before the warm-up condition is fulfilled, one may wait until the warm-up condition is fulfilled.

According to one embodiment, the replacement condition may comprise a condition (named planned outage condition) requiring that a planned outage period has started. This may enable to replace the first database node as soon as the planned outage is reached regardless of how well the second database node is already prepared for the workloads (e.g., regardless of the warm-up condition being fulfilled or not).

In another example, the planned outage may be tied to the warm-up condition of the second database node. For that, the replacement condition may comprise both the warm-up condition and the planned outage condition. That is, the replacement condition is fulfilled if both the warm-up and planned outage conditions are fulfilled. In one use case, after the evaluated performance indicators have indicated that the first database node can be replaced (e.g., the warm-up condition is fulfilled) and before the planned outage condition is fulfilled, it may further be checked whether the planned outage period starts or not in order to execute the replacement of the first database node by the second database node. This may minimize downtime for components of a DBMS during planned outages and minimize end user impacts during planned outages of components within the DBMS. In another use case, if the planned outage condition is fulfilled before the warm-up condition is fulfilled, the start time of the planned outage may be shifted until the warm-up condition is fulfilled in order to execute the replacement of the first database node by the second database node.

According to one embodiment, the replacing of the first database node by the second database node is performed if a difference between corresponding evaluated performance indicators is smaller than a respective threshold.

According to one embodiment, the one or more performance indicators comprise a statement preparation time, cache hit ratio, and statement execution time. The statement preparation time may be the time required by the node to prepare a read-only statement before executing it. The statement execution time may be the duration of execution of the read-only statement at the node. The cache hit ratio may be a measurement of how many content requests a cache (also referred to as local cache structures) is able to fill successfully, compared to how many requests it receives.

According to one embodiment, the performance indicator is a cache hit ratio, wherein a comparison of the cache hit ratio between the first database node and the second database node indicates whether a cache of the second database node has been sufficiently warmed-up. For example, if the difference between the cache hit ratio of the first database node and the cache hit ratio of the second database node is smaller than a threshold (e.g., 3%), the cache of the second database node is said to be sufficiently warmed-up.

According to one embodiment, the second database node is configured to ignore results of the execution of the modified data access request, wherein the first database node is configured to provide the results of the execution of the data access request. Ignoring the results may be performed by not sending by the second database node the results to the first database node.

According to one embodiment, before executing the method, the second database node is added by connecting the second database node to each database node of the DBMS.

According to one embodiment, the data access request comprises a set of one or more database statements.

According to one embodiment, the data access request comprises at least a database read statement.

According to one embodiment, the first database node is configured to duplicate the data access request and route the duplicated data access request to the second database node in response to determining that the data access request comprises at least one database read statement. This may save resources that would otherwise be required to route a data access request that has only data changing statements, and which is not used/executed at the second database node.

FIG. 1 is a schematic representation of a computer system 100 in accordance with an example of the present subject matter. The computer system 100 comprises a cluster 110 of database nodes A, B, C to N (101, 102, 103 and 104) and a database 120. The database nodes (101, 102, 103 and 104) may be hosted on individual servers or multiple logical nodes may exist on a single server. The database nodes (101, 102, 103 and 104) may have access to the shared database 120. The database nodes (101, 102, 103 and 104) may be synchronized so that each database node is going to have the exact same data as all the other database nodes of the cluster.

Inter-node communication occurs by communication conduits such as data links or sockets 106. Each node (101, 102, 103 and 104) of the computer system 100 maintains a link with each other node in the cluster 110. For example, Node A 101, maintains individual links with Node B 102, Node C 103, and every node in the cluster to Node N 104. Communications between nodes of the cluster 110 facilitate coordination of database transactions such as database queries and updates.

The database node B 102 may be taken offline during a planned outage. However, from an application viewpoint, the DBMS capacity may need to be kept steady to fulfill agreed response times. Keeping the DBMS capacity steady may be accomplished by first introducing a new database node and then taking the other database node 102 offline for maintenance. As indicated in FIG. 1, a new shadow node B' 107 is added to the cluster of nodes according to the present subject matter. The node B' 107 is intended to replace the node B 102. The node B' 107 has also access to the database 120 and it may be synchronized with the nodes of the cluster 110 so that each database node is going to have the exact same data as all the other database nodes of the cluster.

The system 100 may be managed by a DBMS such as a DBMS operated within a cloud environment. The DBMS operated within a cloud environment often have demand for availability and often follow the recommendation to distribute their services over one or more database nodes. Using this system 100 allows a dynamic allocation of DBMS services to the database nodes. Each database node (101, 102, 103 and 104) may process an almost equal amount of application workloads. This may be advantageous because the application usually distributes its workloads to database nodes in round robin manner.

Figure 2:
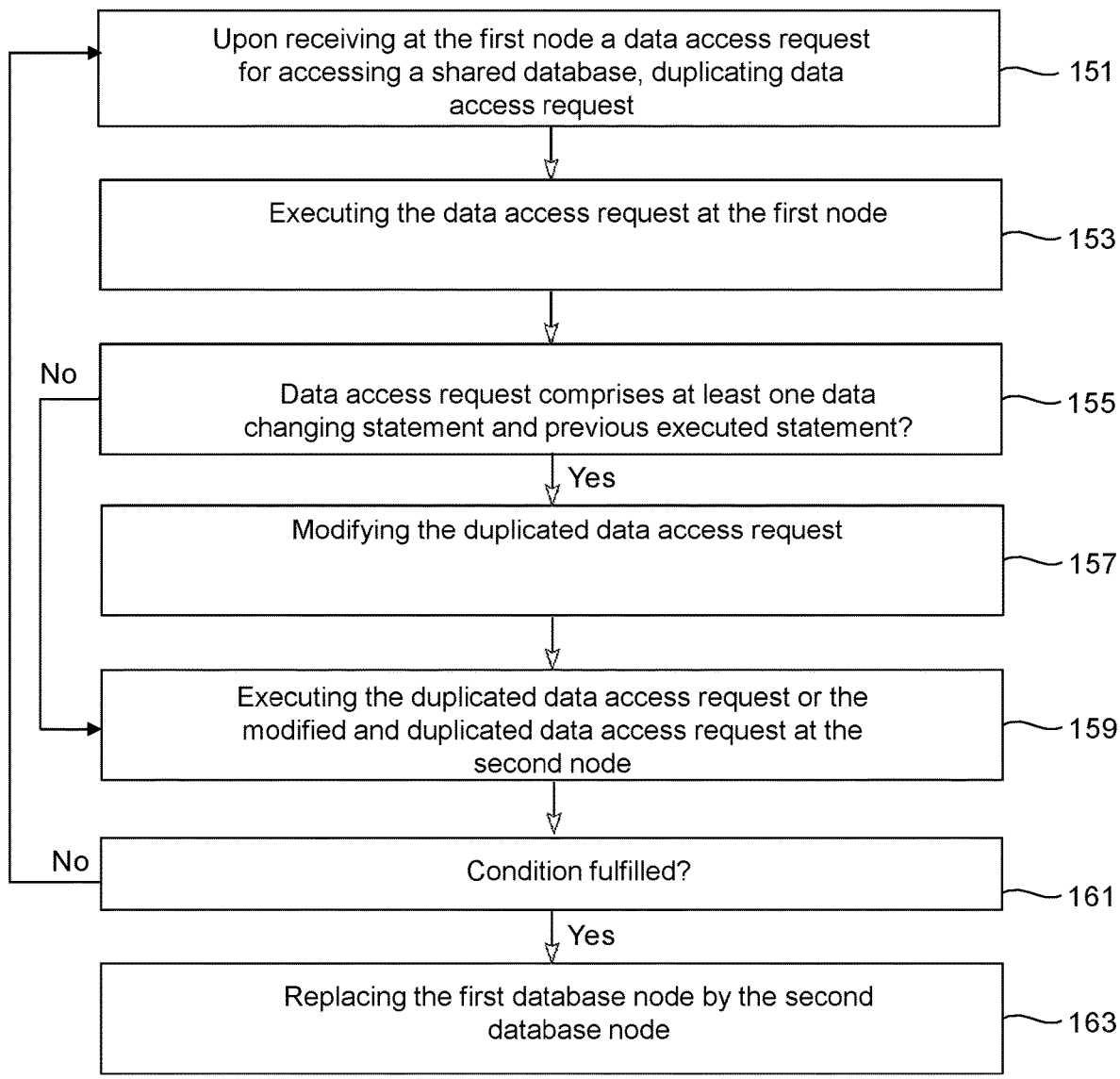
FIG. 2 is a flowchart of a method for replacing a first node by a second node in accordance with an example of the present subject matter.

FIG. 2 is a flowchart of a method for replacing a first node in a cluster by a second node in accordance with an example of the present subject matter. For the purpose of explanation, the method described in FIG. 2 may be implemented in the system illustrated in FIG. 1, but is not limited to this implementation. The first node may, for example, be node B 102 of FIG. 1 and the second node may, for example, be node B' 107 of FIG. 1. The method of FIG. 2 may, for example, enable to replace the first node 102 by the second node 107 of the cluster 110.

Upon receiving in step 151 at the first database node a data access request for accessing the database 120, the first database node 102 may duplicate in step 151 the data access request. The data access request may be executed in step 153 at the first database node 102. The data access request may, for example, be assigned by the DBMS to the first node 102 as part of a (normal) process management by the DBMS using the cluster 110. This means that other data access requests may have been assigned to other nodes (other than the shadow node 107) of the cluster 110.

It may be determined (inquiry step 155) whether the duplicated data access request comprises at least one of a data changing statement and a previously executed statement. The data changing statement may, for example, comprise a statement that modifies data such as an INSERT, UPDATE or DELETE statement. The previously executed statement may be a statement that has been executed previously (e.g., in a previous iteration of the present method) by the second database node in order to read the same data.

If it is determined that the duplicated data access request comprises at least one of the data changing statement and the previously executed statement, the duplicated data access request may be modified in step 157 for preventing execution of the at least one of data changing statement and the previously executed statement at the second database node 107. If the data access request comprises at least one of the data changing statement and the previously executed statement it may be modified by removing the at least one of at least one of the data changing statement and the previously executed statement from the data access request. If the data access request comprises a data changing statement it may be modified by removing the data changing statement from the data access request. If the data access request comprises a previously executed statement it may be modified by removing the previously executed statement from the data access request.

Modifying the data access request may prevent a change of the database content by the second database node. The modification may also eliminate repeatedly executed similar select statements. This may prevent reoccurring select statements from being executed repeatedly without effectively further improving the warm-up state of the local cache structures of the second database node.

In one example, steps 155 and 157 may be implemented at the first database node. In this case, the first database node 102 may route or forward the duplicated data access request or, if modified, the modified data access request to the second database node 107. In other words, if the duplicated data access request is modified by the first database node 102, the first database node 102 may forward, e.g., in step 157, the modified duplicated data access request to the second database node 107. If the data access request is not modified by the first database node 102, the first database node 102 may forward, e.g., in step 155, the duplicated data access request to the second database node 107.

In one example, steps 155 and 157 may be implemented at the second database node. In this case, the first database node 102 may route or forward e.g., in step 153, the duplicated data access request to the second database node 107.

If the duplicated data access request is not modified, the second database node 107 may execute in step 159 the duplicated data access request at the second database node 107. If the duplicated data access request is modified, the second database node 107 may execute in step 159 the modified duplicated data access request at the second database node 107.

If (inquiry step 161) a replacement condition is not fulfilled, steps 151 to 161 may be repeated for a further received data access request. If the replacement condition is fulfilled, the first database node 102 may be replaced in step 163 by the second database node 107.

The replacement condition may comprise the warm-up condition so that the replacement condition is fulfilled if the warm-up condition is fulfilled. In another example, the replacement condition may comprise the unplanned outage condition so that the replacement condition is fulfilled if the unplanned outage condition is fulfilled. In another example, the replacement condition may comprise the planned outage condition so that the replacement condition is fulfilled if the planned outage condition is fulfilled. In another example, the replacement condition may comprise the warm-up condition and the unplanned outage condition so that the replacement condition is fulfilled if both the warm-up and unplanned outage conditions are fulfilled. In another example, the replacement condition may comprise the warm-up condition and the planned outage condition so that the replacement condition is fulfilled if both the warm-up and planned outage conditions are fulfilled.

The warm-up condition may require that a difference between corresponding evaluated performance indicators of the first and second nodes is smaller than a respective threshold. The unplanned outage condition requires that the first database node has become unavailable. The planned outage condition requires that a planned outage period has started.

Figure 3:
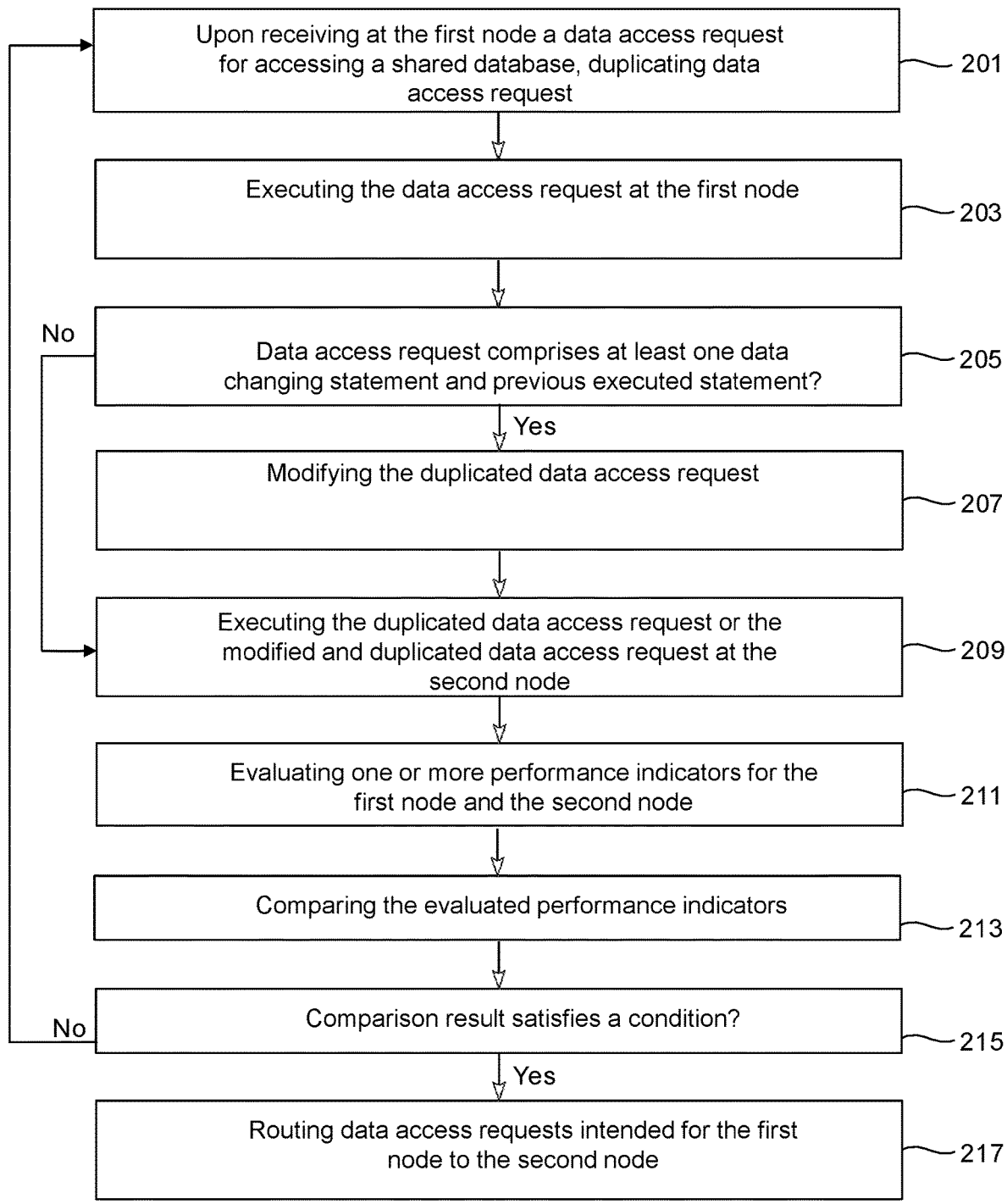
FIG. 3 is a flowchart of a method for replacing a first node by a second node in accordance with an example of the present subject matter.

FIG. 3 is a flowchart of a method for replacing a first node in a cluster by a second node in accordance with an example of the present subject matter. For the purpose of explanation, the method described in FIG. 3 may be implemented in the system illustrated in FIG. 1, but is not limited to this implementation. The first node may, for example, be node B 102 of FIG. 1 and the second node may, for example, be node B' 107 of FIG. 1. The method of FIG. 3 may, for example, enable to replace the first node 102 by the second node 107 of the cluster 110.

Upon receiving in step 201 at the first database node a data access request for accessing the database 120, the first database node 102 may duplicate in step 201 the data access request. The data access request may be executed in step 203 at the first database node 102. The data access request may, for example, be assigned by the DBMS to the first node 102 as part of a (normal) process management by the DBMS using the cluster 110. This means that other data access requests may have been assigned to other nodes (other than the shadow node 107) of the cluster 110.

It may be determined (inquiry step 205) whether the duplicated data access request comprises at least one of a data changing statement and a previously executed statement. The data changing statement may, for example, comprise a statement that modifies data such as an INSERT, UPDATE or DELETE statement. The previously executed statement may be a statement that has been executed previously (e.g., in a previous iteration of the present method) by the second database node in order to read the same data.

If it is determined that the duplicated data access request comprises at least one of the data changing statement and the previously executed statement, the duplicated data access request may be modified in step 207 for preventing execution of the at least one of data changing statement and the previously executed statement at the second database node 107. If the data access request comprises at least one of the data changing statement and the previously executed statement it may be modified by removing the at least one of at least one of the data changing statement and the previously executed statement from the data access request. If the data access request comprises a data changing statement the data access request may be modified by removing the data changing statement from the data access request. If the data access request comprises a previously executed statement the data access request may be modified by removing the previously executed statement from the data access request.

Modifying the data access request may prevent a change of the database content by the second database node. The modification may also eliminate repeatedly executed similar select statements. This may prevent that reoccurring select statements are executed repeatedly without effectively further improving the warm-up state of the local cache structures of the second database node.

In one example, steps 205 and 207 may be implemented at the first database node. In this case, the first database node 102 may route or forward the duplicated data access request or, if modified, the modified data access request to the second database node 107. In other words, if the duplicated data access request is modified by the first database node 102, the first database node 102 may forward, e.g., in step 207, the modified duplicated data access request to the second database node 107. If the data access request is not modified by the first database node 102, the first database node 102 may forward, e.g., in step 205, the duplicated data access request to the second database node 107.

In one example, steps 205 and 207 may be implemented at the second database node. In this case, the first database node 102 may route or forward e.g., in step 203, the duplicated data access request to the second database node 107.

If the duplicated data access request is not modified, the second database node 107 may execute in step 209 the duplicated data access request at the second database node 107. If the duplicated data access request is modified, the second database node 107 may execute in step 209 the modified duplicated data access request at the second database node 107.

Executing the modified/duplicated data access request may be advantageous as it may read data from a disk into the memory of the local cache structures of the second database node 107 and therefore the local cache structures of the second database node 107 may warm up. The next time a query needs to access the same data or subset of this data it may take advantage of the local cache structures resulting in the expected response time.

N performance indicators $PI_1 \ldots PI_N$, where $N \geq 1$, may be evaluated in step 211 for the first database node 102 and the second database node 107. That is, each performance indicator $PI_i$ (where i varies between 1 and N) may be evaluated twice, one for the first database node 102 to obtain the value $PI_i^1$ of the performance indicator $PI_i$ and a second time for the second database node 107 to obtain the value $PI_i^2$ performance indicator $PI_i$.

The evaluated performance indicators may be compared in step 213. For example, the pair of values $(PI_i^1, PI_i^2)$ of each performance indicator $PI_i$ may be compared. This may result in N individual comparison results. The comparison may, for example, comprise computing a ratio of the pair of values $(PI_i^1, PI_i^2)$ or a difference between the pair of values $(PI_i^1, PI_i^2)$. Each of the individual comparison results may comprise a value. The individual comparison results may, for example, be combined e.g., summed or averaged, to obtain the comparison result.

If (step 215) the comparison result satisfies a condition, the first database node 102 may be replaced in step 217 by the second database node 107; otherwise, the method may be repeated for a further data access request. The condition may, for example, be the replacement condition. The condition may, for example, require that each individual value of the comparison result of a pair of values $(PI_i^1, PI_i^2)$ is smaller than a threshold $T_i$, (where i varies between 1 and N). In another example, the condition may require that the combined comparison result is smaller than a threshold. The preparation phase of the second database node 107 may, for example, be defined by steps 201 to 209.

Figure 4:
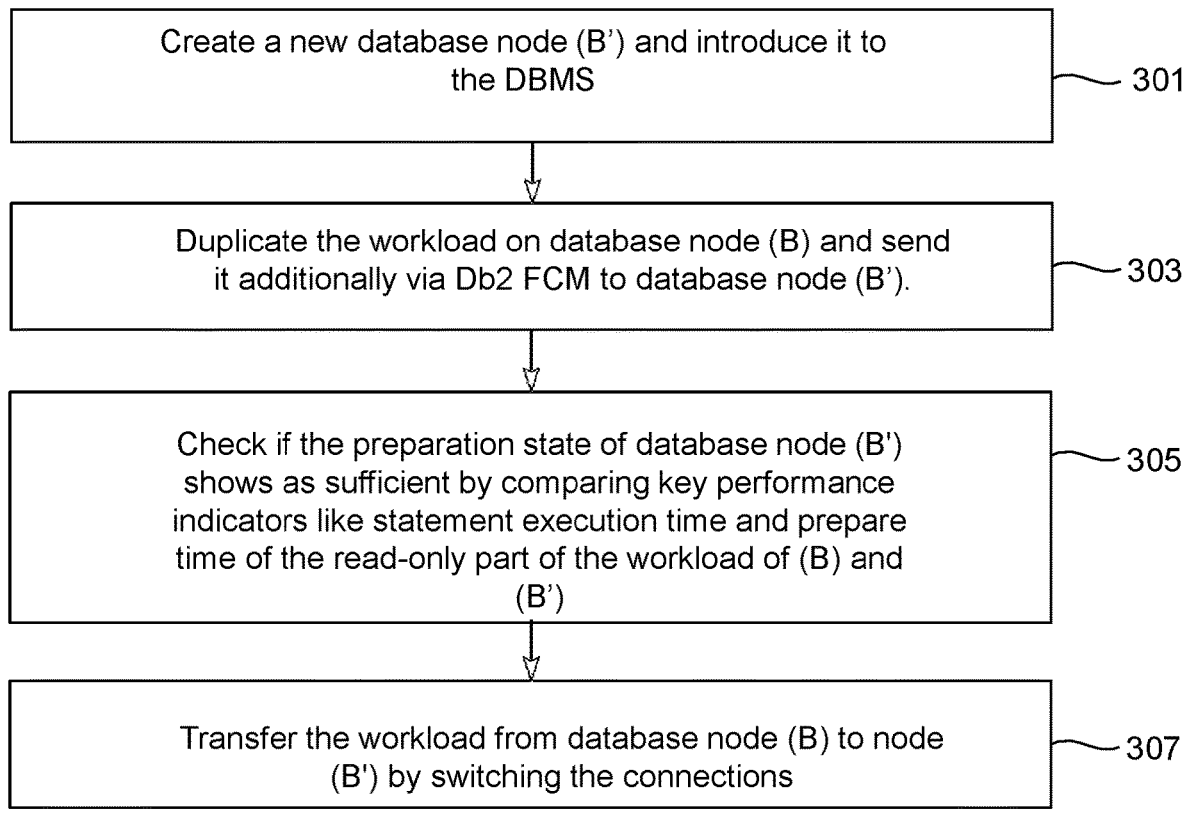
FIG. 4 is a flowchart of a method for replacing a first node B by a second node B' in accordance with an example of the present subject matter.

FIG. 4 is a flowchart of a method for replacing a first node by a second node in accordance with an example of the present subject matter. For the purpose of explanation, the method described in FIG. 4 may be implemented in the system illustrated in FIG. 1, but is not limited to this implementation.

Assume, for example, the DBMS of a cloud provider consists of two database nodes (A) and (B). Database node (B) must be shut down for a planned maintenance. Database node (A) can continue. Due to the demand to keep capacity steady, the application workload which is usually handled by node (B) may be transferred, according to the present subject matter, to some other database node as described below. The DBMS is operated in data sharing mode. This may ensure consistency of the persistent data on storage and the volatile data in local cache structures of participating database nodes.

A new database node (B') is created in step 301 and introduced to the DBMS. Its task is to finally run the workload which is currently handled by the database node to be maintained (B). Database node (B') is able to access the data like node (B) in read only mode.

The workload is duplicated in step 303 on database node (B) and sent additionally e.g., via Db2 Fast Communication Manager (FCM), to database node (B'). Here the duplicated workload is modified and all data changing statements are eliminated from the duplicated workload. Performing the duplication of the workload on database node (B') may minimize the impact of the process on database node (B). This leaves the read-only parts of the workload (e.g., select statements) to be applied on database node (B'). The statements of the modified workload do not report the result sets to the user. FCM is responsible for communication between a first database node and a second database node. The DBMS, specifically prefetchers of the buffer pool of the DBMS, will read data from disk into the memory of the local cache structures of the new database node (B') and therefore the local cache structures may warm up. The next time a query needs to access the same data or subset of this data it may take advantage of the local cache structure resulting in the expected response time.

Alternatively, to simply duplicate the workload, a filtering may take place on database node (B) so that merely the read-only part of the workload is additionally sent to database node (B'). Optionally to both alternatives described above, repeatedly executed similar select statements may be eliminated, too. This may prevent that reoccurring select statements are executed repeatedly without effectively further improving the warm-up state of the local cache structures. A check may be performed in step 305. The check determines if the preparation state of database node (B') is sufficient by comparing key performance indicators like statement execution time and prepare time of the read-only part of the workload of database nodes (B) and (B'). The workload may be transferred in step 307 from database node (B) to node (B') by switching the connections. When all workload on database node (B) has seized it can be taken offline for the maintenance task or removed from the DBMS. Removing the node from the DBMS means that the node is removed from the cluster and that the DBMS may not use the node to process workloads.

Figure 5:
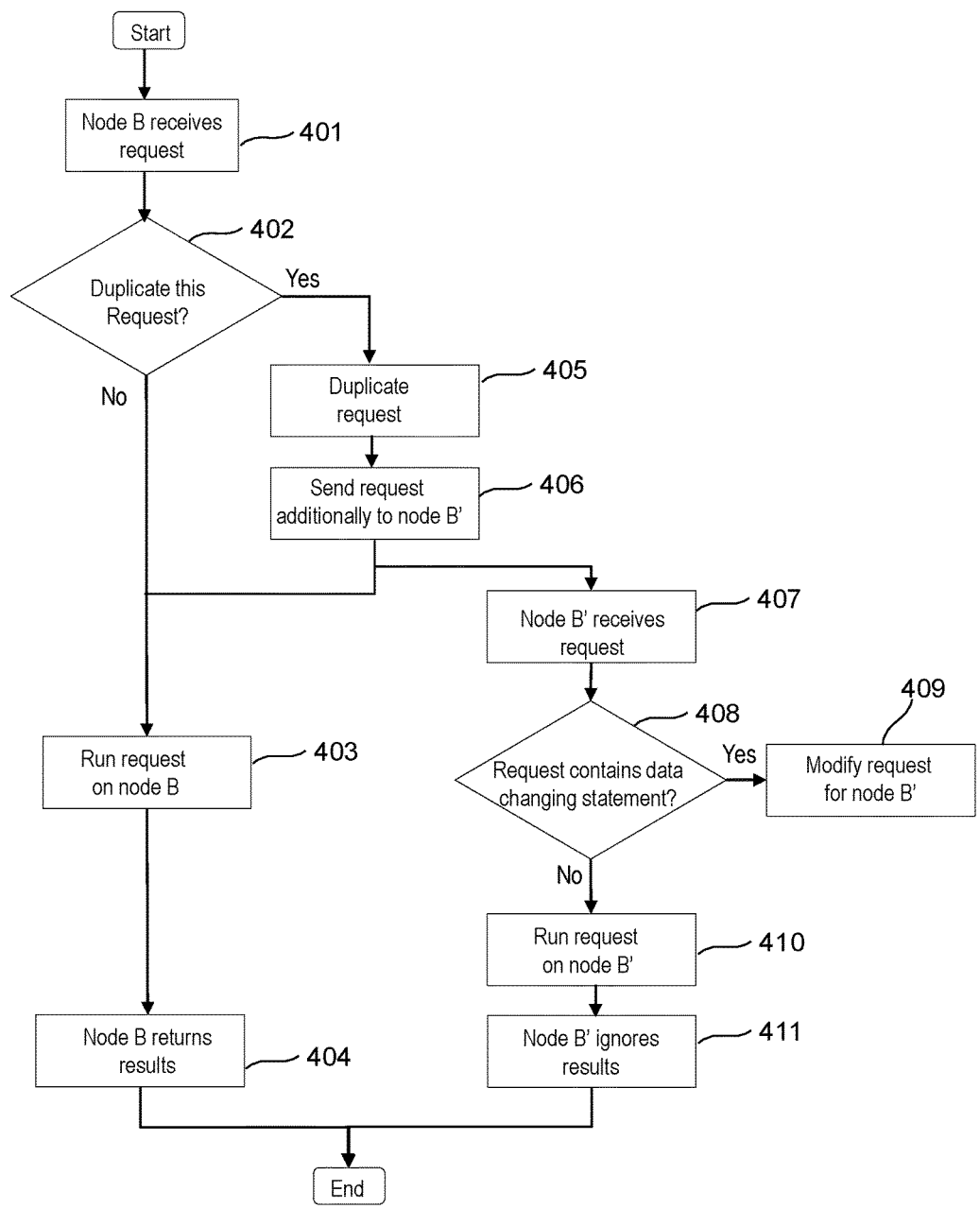
FIG. 5 is a flowchart of a method for preparing a node for execution of workloads in accordance with an example of the present subject matter.

FIG. 5 is a flowchart of a method for preparing a node for execution of workloads in accordance with an example of the present subject matter. For the purpose of explanation, the method described in FIG. 5 may be implemented in the system illustrated in FIG. 1, but is not limited to this implementation.

Node B 102 may receive in step 401 the request to execute an SQL statement. Node B 102 may decide (402) if the request needs to be duplicated and should run on the shadow node B' 107. If the request needs to be duplicated and should run on the shadow node B' 107, the method may continue with step 405, otherwise it may continue with a usual request processing in steps 403 and 404.

The messaging subsystem on node B 102 may duplicate in step 405 the request in order to run it on node B' 107. The messaging subsystem forwards in step 406 the duplicated request to node B' 107. The node B' 107 may receive in step 407 the duplicated request and analyze the request. If (408) the duplicated request contains SQL statements with data changing elements, it may be modified before it is executed. The node B' 107 may modify in step 409 the request, so that all data changing elements are eliminated. This may result in the request containing only the read-only parts. This means SQL statements which contain modification keywords such as INSERT/DELETE/UPDATE keywords may be modified in order not to change any data. In contrast, SQL statements which solely contain SELECT statements may run unmodified. The duplicated and modified request may be executed in step 410 on node B' 107. As the results of the duplicated request may not be of interest for node B 102, node B' 107 does not need to transmit the results back to node B 102 and may ignore (411) them.

The duplication of workloads on database node (B') may be kept active until the memory of the local cache structures are also filled on node B' similarly to the ones on node B. This means that the buffer pool of node B' has been warmed up. The duplication of workloads on database node (B') may be kept active by repeating the method steps of FIG. 5. The preparation phase of the database node B' may, for example, be defined by the method steps of FIG. 5.

Figure 6:
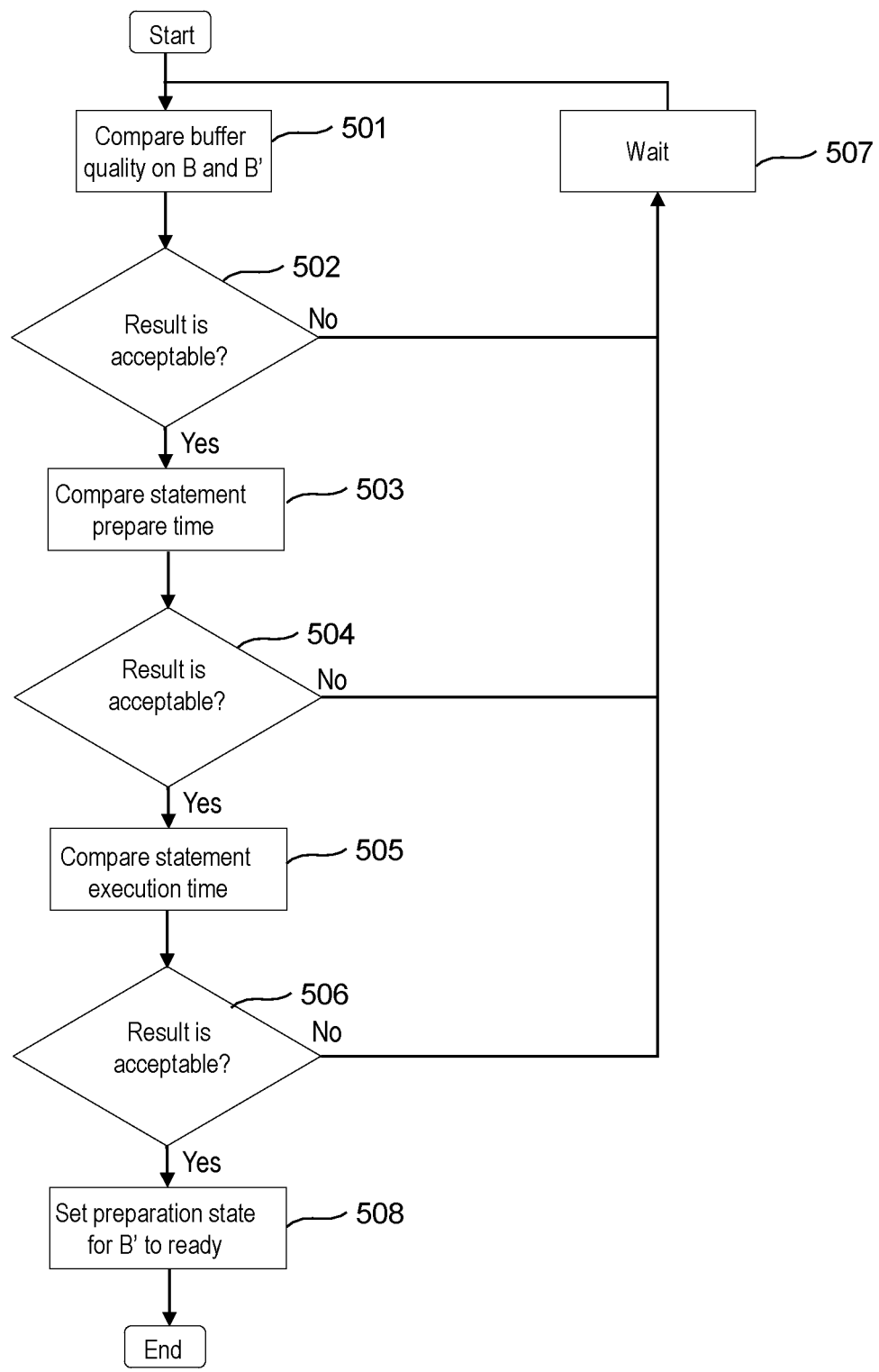
FIG. 6 is a flowchart of a method for replacing a first node by a second node in accordance with an example of the present subject matter.

FIG. 6 is a flowchart of a method for replacing a first node in a cluster by a second node in accordance with an example of the present subject matter. For the purpose of explanation, the method described in FIG. 6 may be implemented in the system illustrated in FIG. 1, but is not limited to this implementation. The method may evaluate the preparation state of the shadow database node B' 107. Three key performance indicators, namely a buffer quality, statement preparation time and statement execution time may be used for the method of FIG. 6.

The buffer quality may be compared in step 501 between node B 102 and node B' 107. If (502) the result is acceptable (e.g., the result is acceptable means that the bufferpool quality difference between node B and node B' is less than 3%), the method may continue with the next check (503), otherwise the method may attempt to reach a better quality and repeat the process from beginning after waiting (507) for a next request be assigned to node B. The statement preparation times for the SELECT statements may be compared in step 503 between node B and node B'. By comparing these statement preparation times, the confidence may be gained about the quality of the buffer pool of node B' 107. If (504) the result is acceptable (e.g., the result is acceptable means that the statement preparation times differ between nodes B and B' by less than 3%), the method may continue with the next check (505), otherwise the method may repeat the process from beginning after waiting (507). Statement execution times for the SELECT statements may be compared in step 505 between node B and B'. By further comparing these statement execution times even more confidence may be gained about the quality of the buffer pool of node B'. If (506) the result is acceptable (e.g., the result is acceptable means that the statement execution times differ between nodes B and B' by less than 3%), the method may continue with step 508, otherwise the method may repeat the process from beginning after waiting (507). At this stage all the above checks were rated as acceptable. Therefore, the preparation state (508) of node B' is sufficient and it is ready to accept the workload of node B. The full workload can now be switched from node B to node B'.

Figure 7:
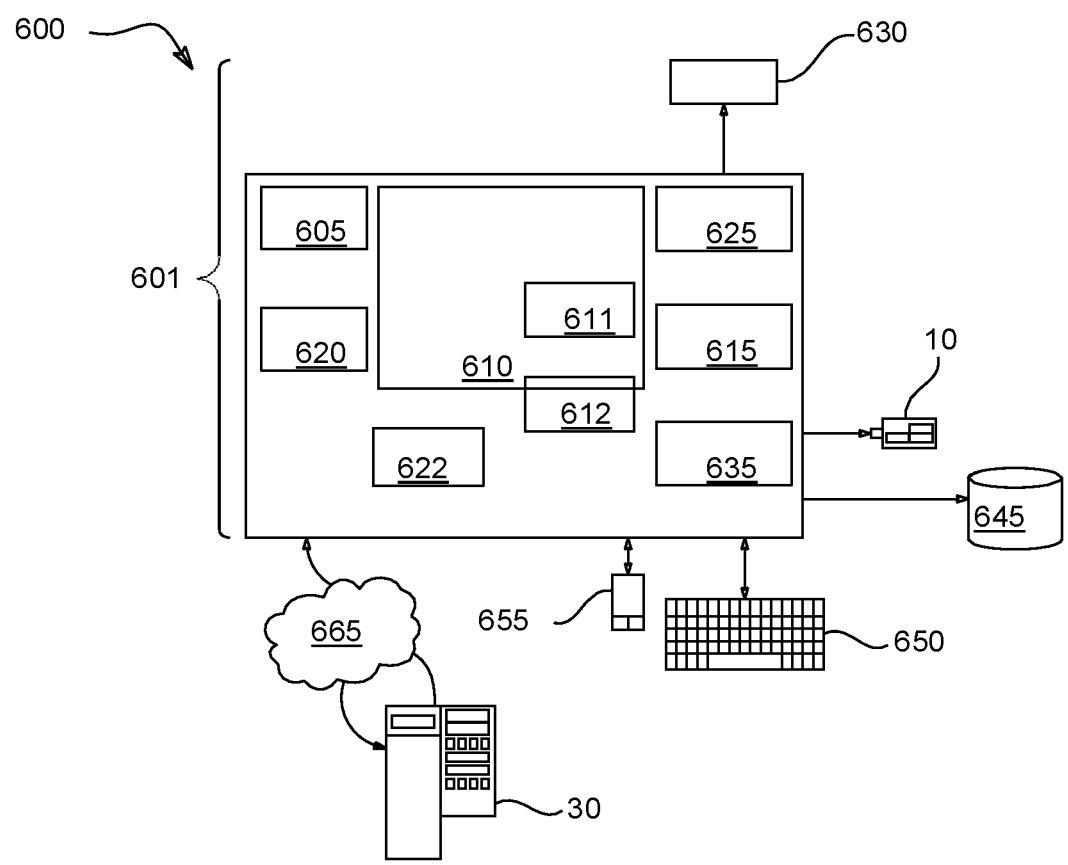
FIG. 7 represents a general computerized system suited for implementing at least part of method steps as involved in the disclosure.

FIG. 7 represents a general computerized system 600 suited for implementing at least part of method steps as involved in the disclosure. For example, each of the nodes may comprise the computer 601.

It will be appreciated that the methods described herein are at least partly non-interactive, and automated by way of computerized systems, such as servers or embedded systems. In exemplary embodiments though, the methods described herein can be implemented in a (partly) interactive system. These methods can further be implemented in software instructions 612, (including firmware 622), hardware (processor) 605, or a combination thereof. In exemplary embodiments, the methods described herein are implemented in software, as an executable program, and is executed by a special or general-purpose digital computer, such as a personal computer, workstation, minicomputer, or mainframe computer. The most general system 600 therefore includes a general-purpose computer 601.

In exemplary embodiments, in terms of hardware architecture, as shown in FIG. 7, the computer 601 includes a processor 605, memory (main memory) 610 coupled to a memory controller 615, and one or more input and/or output (I/O) devices 10, 645 that are communicatively coupled via a local input/output controller 635. The input/output controller 635 can be, but is not limited to, one or more buses or other wired or wireless connections, as is known in the art. The input/output controller 635 may have additional elements, which are omitted for simplicity, such as controllers, buffers (caches), drivers, repeaters, and receivers, to enable communications. Further, the local interface may include address, control, and/or data connections to enable appropriate communications among the components. As described herein the I/O devices 10, 645 may generally include any generalized cryptographic card or smart card known in the art.

The processor 605 is a hardware device for executing software, particularly that stored in memory 610. The processor 605 can be any custom made or commercially available processor, a central processing unit (CPU), an auxiliary processor among several processors associated with the computer 601, a semiconductor-based microprocessor (in the form of a microchip or chip set), or generally any device for executing software instructions.

The memory 610 can include any one or combination of volatile memory elements (e.g., random access memory (RAM, such as DRAM, SRAM, SDRAM, etc.)) and nonvolatile memory elements (e.g., ROM, erasable programmable read only memory (EPROM), electronically erasable programmable read only memory (EEPROM), programmable read only memory (PROM). Note that the memory 610 can have a distributed architecture, where various components are situated remote from one another, but can be accessed by the processor 605.

The software in memory 610 may include one or more separate programs, each of which comprises an ordered listing of executable instructions for implementing logical functions, notably functions involved in embodiments of this invention. In the example of FIG. 7, software in the memory 610 includes instructions 612 e.g., instructions to manage databases such as a database management system.

The software in memory 610 shall also typically include a suitable operating system (OS) 611. The OS 611 essentially controls the execution of other computer programs, such as instructions 612 for implementing methods as described herein.

The methods described herein may be in the form of instructions 612, executable program (object code), script, or any other entity comprising instructions 612 to be performed. When a source program, then the program needs to be translated via a compiler, assembler, interpreter, or the like, which may or may not be included within the memory 610, to operate properly in connection with the OS 611. Furthermore, the methods can be written as an object-oriented programming language, which has classes of data and methods, or a procedure programming language, which has routines, subroutines, and/or functions.

In exemplary embodiments, a conventional keyboard 650 and mouse 655 can be coupled to the input/output controller 635. Other output devices such as the I/O devices 10, 645 may include input devices, for example but not limited to a printer, a scanner, microphone, and the like. Finally, the I/O devices 10, 645 may further include devices that communicate both inputs and outputs, for instance but not limited to, a network interface card (NIC) or modulator/demodulator (for accessing other files, devices, systems, or a network), a radio frequency (RF) or other transceiver, a telephonic interface, a bridge, a router, and the like. The I/O devices 10, 645 can be any generalized cryptographic card or smart card known in the art. The system 600 can further include a display controller 625 coupled to a display 630. In exemplary embodiments, the system 600 can further include a network interface for coupling to a network 665. The network 665 can be an IP-based network for communication between the computer 601 and any external server, client and the like via a broadband connection. The network 665 transmits and receives data between the computer 601 and external systems 30, which can be involved to perform part, or all of the steps of the methods discussed herein. In exemplary embodiments, network 665 can be a managed IP network administered by a service provider. The network 665 may be implemented in a wireless fashion, e.g., using wireless protocols and technologies, such as WiFi, WiMax, etc. The network 665 can also be a packet-switched network such as a local area network, wide area network, metropolitan area network, Internet network, or other similar type of network environment. The network 665 may be a fixed wireless network, a wireless local area network W(LAN), a wireless wide area network (WWAN) a personal area network (PAN), a virtual private network (VPN), intranet or other suitable network system and includes equipment for receiving and transmitting signals.

If the computer 601 is a PC, workstation, intelligent device or the like, the software in the memory 610 may further include a basic input output system (BIOS) firmware 622. The BIOS is a set of essential software routines that initialize and test hardware at startup, start the OS 611, and support the transfer of data among the hardware devices. The BIOS is stored in ROM so that the BIOS can be executed when the computer 601 is activated.

When the computer 601 is in operation, the processor 605 is configured to execute instructions 612 stored within the memory 610, to communicate data to and from the memory 610, and to generally control operations of the computer 601 pursuant to the software. The methods described herein and the OS 611, in whole or in part, but typically the latter, are read by the processor 605, possibly buffered within the processor 605, and then executed.

When the systems and methods described herein are implemented in software instructions 612, as is shown in FIG. 7, the methods can be stored on any computer readable medium, such as storage 620, for use by or in connection with any computer related system or method. The storage 620 may comprise a disk storage such as HDD storage.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand There is a sense of location independence in that the consumer generally has no control or knowledge over the exact location of the provided resources but may be able to specify location at a higher level of abstraction (e.g., country, state, or data center).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, apart from limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer can deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 8:
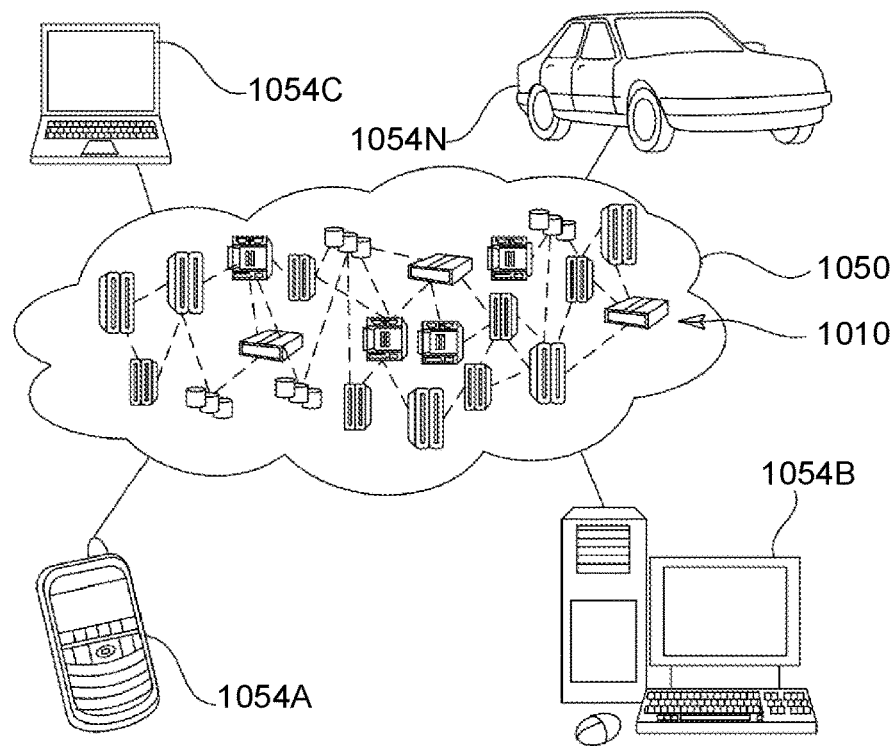
FIG. 8 depicts a cloud computing environment according to an embodiment of the present invention.

Referring now to FIG. 8, illustrative cloud computing environment 1050 is depicted. As shown, cloud computing environment 1050 includes one or more cloud computing nodes 1010 with which local computing devices used by cloud consumers, such as, for example, personal digital assistant (PDA) or cellular telephone 1054A, desktop computer 1054B, laptop computer 1054C, and/or automobile computer system 1054N may communicate. Nodes 1010 may communicate with one another. They may be grouped (not shown) physically or virtually, in one or more networks, such as Private, Community, Public, or Hybrid clouds as described hereinabove, or a combination thereof. This allows cloud computing environment 1050 to offer infrastructure, platforms and/or software as services for which a cloud consumer does not need to maintain resources on a local computing device. It is understood that the types of computing devices 1054A-N shown in FIG. 8 are intended to be illustrative only and that computing nodes 1010 and cloud computing environment 1050 can communicate with any type of computerized device over any type of network and/or network addressable connection (e.g., using a web browser).

Figure 9:
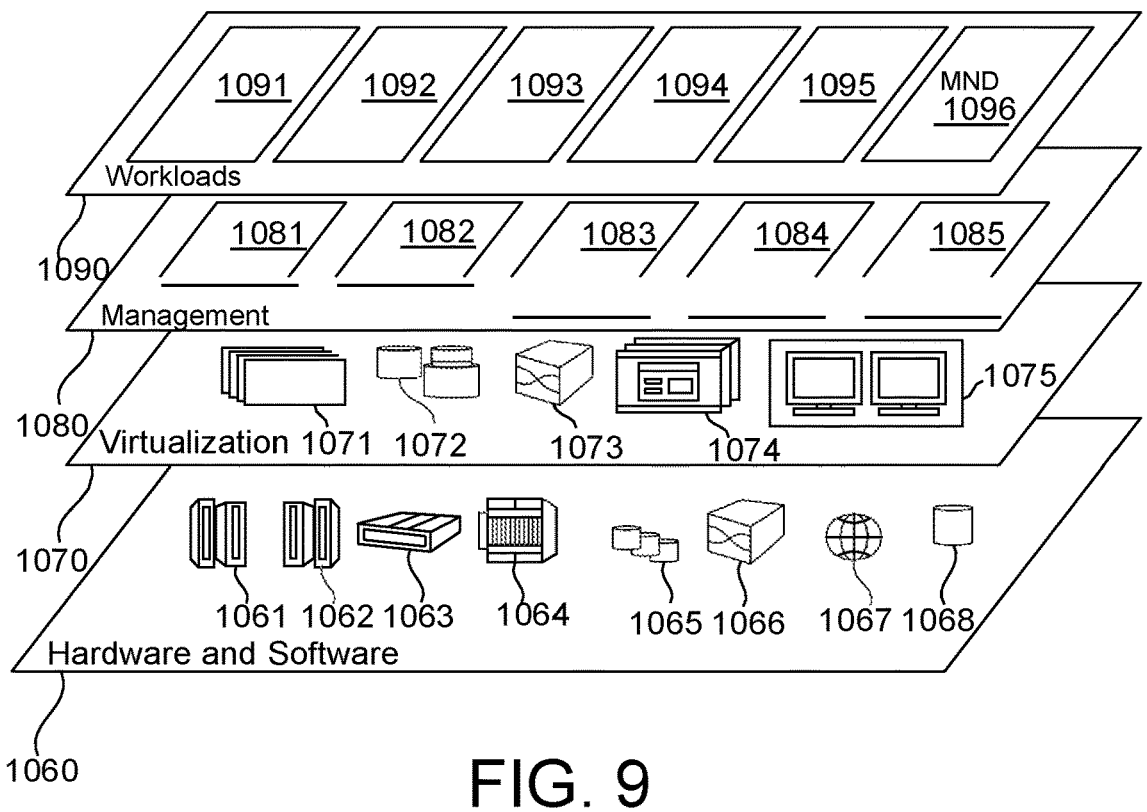
FIG. 9 depicts abstraction model layers according to an embodiment of the present invention.

Referring now to FIG. 9, a set of functional abstraction layers provided by cloud computing environment 1050 (FIG. 8) is shown. It should be understood in advance that the components, layers, and functions shown in FIG. 9 are intended to be illustrative only and embodiments of the invention are not limited thereto. As depicted, the following layers and corresponding functions are provided:

Hardware and software layer 1060 includes hardware and software components. Examples of hardware components include: mainframes 1061; RISC (Reduced Instruction Set Computer) architecture-based servers 1062; servers 1063; blade servers 1064; storage devices 1065; and networks and networking components 1066. In some embodiments, software components include network application server software 1067 and database software 1068.

Virtualization layer 1070 provides an abstraction layer from which the following examples of virtual entities may be provided: virtual servers 1071; virtual storage 1072; virtual networks 1073, including virtual private networks; virtual applications and operating systems 1074; and virtual clients 1075.

In one example, management layer 1080 may provide the functions described below. Resource provisioning 1081 provides dynamic procurement of computing resources and other resources that are utilized to perform tasks within the cloud computing environment. Metering and Pricing 1082 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 1083 provides access to the cloud computing environment for consumers and system administrators. Service level management 1084 provides cloud computing resource allocation and management such that required service levels are met. Service Level Agreement (SLA) planning and fulfillment 1085 provide pre-arrangement for, and procurement of, cloud computing resources for which a future requirement is anticipated in accordance with an SLA.

Workloads layer 1090 provides examples of functionality for which the cloud computing environment may be utilized. Examples of workloads and functions which may be provided from this layer include: mapping and navigation 1091; software development and lifecycle management 1092; virtual classroom education delivery 1093; data analytics processing 1094; transaction processing 1095; and managing nodes of a DBMS (MND) 1096 in accordance with the present subject matter e.g., as described with reference to FIG. 2, 3, 4, 5 or 6.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method for replacing a first database node of a database management system with a second database node, the method comprising:
receiving an indication that the first database node received a data access request for accessing a database shared between the first database node and the second database node;
duplicating the data access request at the first database node;
responsive to a determination that the duplicated data access request includes a data changing statement and a previously executed statement, modifying, by the one or more computer processors, the duplicated data access request to prevent execution of the data changing statement and the previously executed statement at the second database node;
executing the modified duplicated data access request at the second database node; and
replacing based on a replacement condition being met, the first database node with the second database node in the database management system.

2. The method of claim 1, further comprising:
evaluating one or more performance indicators for the first database node and the second database node; and
comparing the one or more performance indicators to determine whether the one or more performance indicators satisfy the replacement condition.

3. The method of claim 1, further comprising:
routing the modified duplicated data access request by the first database node to the second database node.

4. The method of claim 1, further comprising:
routing the duplicated data access request by the first database node to the second database node.

5. The method of claim 1, wherein replacing the first database node by the second database node includes routing one or more data access requests intended for the first database node to the second database node and disconnecting the first database node from the database management system.

6. The method of claim 1, wherein the replacement condition requires that the first database node has become unavailable.

7. The method of claim 1, wherein the replacement condition requires that a planned outage period has started.

8. The method of claim 1, wherein the replacement condition requires that a difference between corresponding evaluated performance indicators is smaller than a respective threshold.

9. The method of claim 2, wherein the one or more performance indicators include a statement preparation time, a cache hit ratio, and a statement execution time.

10. The method of claim 9, wherein a comparison of the cache hit ratio between the first database node and the second database node indicates whether a cache of the second database node has been sufficiently warmed-up.

11. The method of claim 1, wherein the second database node is configured to ignore results of the execution of the modified data access request, and wherein the first database node is configured to provide results of the execution of the data access request.

12. The method of claim 1, further comprising:
connecting the second database node to each database node of the database management system.

13. The method of claim 1, wherein the data access request includes a set of one or more database statements.

14. The method of claim 1, wherein the data access request includes at least one database read statement.

15. The method of claim 1, further comprising:
duplicating the first database node; and
routing the data access request to the second database node in response to a determination that the data access request includes at least one database read statement.

16. The method of claim 1, further comprising:
modifying the data access request in the first database node; and
routing the modified data access request to the second database node.

17. A computer program product for replacing a first database node of a database management system by a second database node, the computer program product comprising:
one or more computer readable storage media and program instructions stored on the one or more computer readable storage media, the stored program instructions comprising:
program instructions to receive an indication that the first database node received a data access request for accessing a database shared between the first database node and the second database node;
program instructions to duplicate the data access request at the first database node;
program instructions to, responsive to a determination that the duplicated data access request includes a data changing statement and a previously executed statement, modify the duplicated data access request to prevent execution of the data changing statement and the previously executed statement at the second database node;
program instructions to execute the modified duplicated data access request at the second database node; and
program instructions replace, based on a replacement condition being met, the first database node with the second database node in the database management system.

18. The computer program product of claim 17, the stored program instructions further comprising:
program instructions to evaluate one or more performance indicators for the first database node and the second database node; and
program instructions to compare the one or more performance indicators to determine whether the one or more performance indicators satisfy the replacement condition.

19. A computer system for replacing a first database node of a database management system by a second database node, the computer system comprising:
one or more computer processors;

one or more computer readable storage media; and program instructions stored on at least one of the one or more computer readable storage media for execution by at least one of the one or more computer processors, the stored program instructions comprising:

program instructions to receive an indication that the first database node received a data access request for accessing a database shared between the first database node and the second database node;

program instructions to duplicate the data access request at the first database node;

program instructions to, responsive to a determination that the duplicated data access request includes a data changing statement and a previously executed statement, modify the duplicated data access request to prevent execution of the data changing statement and the previously executed statement at the second database node;

program instructions to execute the modified duplicated data access request at the second database node; and program instructions replace, based on a replacement condition being met, the first database node with the second database node in the database management system.

20. The computer system of claim 19, the stored program instructions further comprising:

program instructions to evaluate one or more performance indicators for the first database node and the second database node; and program instructions to compare the one or more performance indicators to determine whether the one or more performance indicators satisfy the replacement condition.

\* \* \* \* \*